(12) United States Patent
Steingröver et al.

(10) Patent No.: US 7,938,902 B2
(45) Date of Patent: May 10, 2011

(54) CATIONICALLY STABILIZED AQUEOUS SILICA DISPERSION, METHOD FOR ITS PRODUCTION AND ITS USE

(75) Inventors: Klaus Steingröver, Saarbrücken (DE); Frank Tabellion, Saarbrücken (DE); Steffen Pilotek, Austin, TX (US)

(73) Assignee: Buhler Partec GmbH, Saarbrucken (DE)

( * ) Notice: Subject to any disclaimer, the term of this patent is extended or adjusted under 35 U.S.C. 154(b) by 749 days.

(21) Appl. No.: 11/847,473

(22) Filed: Aug. 30, 2007

(65) Prior Publication Data

US 2008/0216709 A1  Sep. 11, 2008

(30) Foreign Application Priority Data

Sep. 1, 2006 (DE) .......................... 10 2006 041 299
Mar. 13, 2007 (DE) .......................... 10 2007 012 578

(51) Int. Cl.
*C08K 3/36* (2006.01)

(52) U.S. Cl. .................................. 106/490; 106/287.11

(58) Field of Classification Search .................. 106/490, 106/287.11

See application file for complete search history.

(56) References Cited

U.S. PATENT DOCUMENTS

| | | | |
|---|---|---|---|
| 6,417,264 | B1 | 7/2002 | Kono et al. |
| 6,420,039 | B1 | 7/2002 | Field et al. |
| 6,777,039 | B2 | 8/2004 | Koike et al. |

FOREIGN PATENT DOCUMENTS

| | | |
|---|---|---|
| DE | 10033054 A1 | 4/2001 |
| DE | 60106258 T2 | 1/2002 |
| DE | 10311722 A1 | 9/2004 |
| DE | 102004030093 A1 | 1/2006 |
| EP | 1559705 A2 | 8/2005 |

*Primary Examiner* — David M Brunsman
(74) *Attorney, Agent, or Firm* — Bachman & LaPointe, P.C.

(57) ABSTRACT

Cationically stablished aqueous silica dispersion, method for its production and its use. A method is described for the production of cationically stabilised silica in which silica is cationically stabilised in the form of an aqueous dispersion or a powder by mixing with an acid aminosilane solution. A cationically stabilised silica powder may be obtained by removing the solvent. The cationically stabilised silica dispersion obtained is highly storage stable. Mixing with organic binding agents such as PVA is possible without a significant increase in viscosity. The dispersions are particularly suitable for coating slips for printing media, such as inkjet paper, but also for the surface treatment of substrates, e.g. for the hard coating of plastics, or in parting compounds or abrasives and polishing agents.

19 Claims, No Drawings

CATIONICALLY STABILIZED AQUEOUS SILICA DISPERSION, METHOD FOR ITS PRODUCTION AND ITS USE

BACKGROUND OF THE INVENTION

The invention relates to a cationically stabilised silica dispersion, a method for its production and its use.

Aqueous silica dispersions are widely used in industry. For example, they are used in coating slips on paper, films and other printing media, as coatings on surfaces such as wood, plastic, metal, textiles and films for improving the mechanical and optical properties of the coating, in coatings on films for better separability or in abrasives and polishing agents for machining surfaces such as ceramics, glasses, glass ceramics and semiconductor wafers in the production of electronic components.

The isoelectric point (IEP) of $SiO_2$ is a pH of 2. $SiO_2$ particles in aqueous suspension are therefore negatively charged at a pH value of over 2, and are therefore anionically stabilised. To produce stable products containing silica it is necessary for the charge of the silica dispersion to have the same sign as the other components of the product, otherwise no stable end products are obtained. Anionically stabilised silica cannot therefore be used in products with cationically charged components.

In addition to the required stability of the composition, there are other reasons for using cationic dispersions, e.g. when the product to be produced is to contain cationic groups. For printing media, for example, it is necessary for the normally anionic dyes to be fixed on a cationic porous printed surface to achieve watertightness and high brilliance, among other things. There are also applications in which an agent is to be precipitated on substrates. In the case of negatively charged substrates cationic agents are naturally suited for the precipitation. For example, there are textile treatment agents in which cationic substances adhere to anionically charged fibres (fabric conditioners). Glass and ceramic surfaces, such as glazed ceramic surfaces, are also negatively charged. Compatibility with the binder is often a problem. Tests have shown that the addition of unmodified aerosol to PVA results in a sharp increase in viscosity.

On the other hand there are other metal oxide particles, e.g. of Ti or Al, that are cationically stabilised in an aqueous suspension, and that can therefore be used without problem in cationic products. However, the price of these metal oxides is much higher than that of $SiO_2$. Since normal silica dispersions cannot be used in products with cationically charged components, as explained above, a modification of $SiO_2$, which allows the use of $SiO_2$ in products with cationically charged components, is of interest.

DE-T2-60106258 describes the use of particles produced hydrolytically in the gas phase, such as $TiO_2$, $Al_2O$, $SiO_2$ for the production of an ink receiving coat, without a description of the treatment of the particles. The production of a cationically stabilised silica dispersion using $SiO_2$ particles containing boron is described in DE-A-10311722.

DE-A-10033054 describes the stabilisation of a silica dispersion by means of cationic organic polymers. U.S. Pat. No. 6,777,039 describes the production of a coating for an inkjet printing medium by the addition of an aqueous solution of polyvinyl alcohol, an organic solvent and a tenside to a silica dispersion and a cationic polymer. U.S. Pat. No. 6,417,264 describes a silica dispersion which is dispersed with an organic cationic polymer in a polar solvent. U.S. Pat. No. 6,420,039 describes a silica dispersion in which $SiO_2$ particles are brought into contact with an aluminium compound in order to achieve stabilisation.

EP-A2-1559750 describes the production of a cationically stabilised silica dispersion in a multi-step method in which an aqueous $SiO_2$ dispersion is repolarised in a first step with an activating reagent such as aluminium chloride hydrate, and the reaction product modified with Al-containing material is treated in a further step with organosilanes. Direct addition of aminosilane to an aqueous solution of silica, without previously being treated with the activating reagent, is also described in this publication as a counter-example. However, according to the method described there, the silica dispersion gels immediately after the addition of aminosilane, so that the stabilisation of silica particles is not possible according to this method.

SUMMARY OF THE INVENTION

The object of the invention consisted in supplying cationically stabilised silica by a simple, and hence low cost method using as few additional reagents as possible, which reagents also have improved stability.

The object was surprisingly achieved by direct modification of silica with aminosilanes, thereby producing by simple means highly stable dispersions with a minimum of additional reagents.

This invention therefore provides a method for producing cationically stabilised silica in the form of an aqueous dispersion or powder, in which a) one or more aminosilanes is or are mixed with an acid in order to obtain an acid aminosilane solution, b) silica in the form of an aqueous dispersion or a powder is converted by mixing with the acid aminosilane solution in order to obtain a cationically stabilised aqueous silica dispersion, and, if necessary, c) the liquid constituents are removed wholly or partially.

Highly stable dispersions with a minimum of additional reagents can easily be obtained in this manner. It was also surprisingly established that cationically stabilised silica dispersions with a very low viscosity were obtained, their viscosity only being slightly increased when organic binders were added. The invention is described in detail in the following.

DETAILED DESCRIPTION

In the method silica is used in the form of powder or in the form of an aqueous dispersion. In particular, the silica is present in the form of particles. If necessary, silica is provided in the form of hydrated $SiO_2$. Silica exists in many different forms and is generally also called silicon oxide or silicon dioxide, or silicic acid, these designations being used interchangeably here. Silica may be amorphous and/or entirely or partially crystalline. It may be used as a powder or in the form of an aqueous dispersion or an aqueous sol (colloidal $SiO_2$), which are also referred to as silica sols.

Silica is a commonly known commercial product whose properties, e.g. particle size, agglomerate condition, degree of crystallinity, specific area, porosity, etc., may vary according to the method of production. All these forms are covered by this invention. An overview of the different types of silica or silicon dioxide or silicic acid and their production can be found, for example, Ullmanns, Encyclopädie der technischen Chemie (Ullmanns, Encyclopaedia of Technical Chemistry), $4^{th}$ Edition, 1982I Vol. 21, pp. 439-476. Here too silica is understood to include particles which have a surface layer or shell of silica and a core of a different material, particularly a metal oxide. Since the surface consists of silica, such particles behave essentially exactly like particles which consist only of silica in terms of the stabilisation of relevance here.

The $SiO_2$ particles used may, for example, have a BET area (measured with nitrogen) ranging from 5 to 1,000 $m^2/g$, preferably 50 to 500 $m^2/g$, and more preferably 100 to 400 $m^2/g$.

Examples of silica which are used in preference in this invention are pyrogenic $SiO_2$, in particular flame pyrolytically produced $SiO_2$, precipitated $SiO_2$ and core-shell particles of a silica shell and a core of metal oxide, i.e. metal oxide particles with a surface coating of $SiO_2$. Suitable commercial products for pyrogenic silicic acids include, for example, the Aerosils® from Degussa, such as Aerosil® 200, the HDK products from Wacker, such as HDK S13, or the Cab-O-Sil® products from Cabot, such as Cab-O-Sil® H5. The pyrogenic silicic acids used preferably have a BET area (measured with nitrogen) ranging from 5 to 600 $m^2/g$, more preferably 50 to 400 $m^2/g$. Suitable commercial products for precipitation silicic acid include, for example, the Sipernat® products from Degussa, such as Sipernat® 310 or Sipernat® 304. The precipitated silicic acids preferably have a BET area (measured under nitrogen) ranging from 50 to 1000 $m^2/g$, more preferably 100 to 800 $m^2/g$.

The metal for the metal oxide particles with a surface coating of $SiO_2$ (core-shell particles) may be any metal, e.g. the core contains $Al_2O_3$, $ZrO_2$, iron oxide or $TiO_2$. Examples of core-shell particles are magnetic iron oxide in a silica matrix, e.g. MagSilica® from Degussa, $SiO_2$-coated ZnO particles, as described in DE-A-10118309, for example, and other metal oxide particles coated with $SiO_2$, for example $TiO_2$ particles, e.g. by coating particles of a metal oxide sol, e.g. $TiO_2$, by hydrolysed silicon alcoholate, e.g. TEOS, as described in DE-A-102004030093, for example.

The silica may also consist of mixed oxides or may be silica doped with a silica proportion of at least 75%. Mixed oxides or doped silica are mixtures on a molecular level which have at least one further type of atom in each primary particle, in addition to oxygen and silicon. They are normally already produced as mixtures in the production process, e.g. in the Aerosil process. Examples of such mixed oxides are systems of $SiO_2$ with main group oxides, e.g. the oxides from sodium, boron, aluminium or phosphorus, or systems of $SiO_2$ with subsidiary group oxides, including the lanthanides, e.g. Ti, Zr, V, Mo, W, Mn, Fe, Ru, Co, Ni, Rh, Pd, Pt, Ce and other lanthanides or combinations thereof. Examples of commercially available mixed oxides are, for example, MOX 80 and MOX 170 from Degussa (mixed oxide $SiO_2$—$Al_2O_3$).

Colloidal silica is also suitable as silica, e.g. normal silica sols may be used. Silica sols are commercially available and can be produced by methods known to the person skilled in the art.

The silica particles may be used in the form of a powder or dispersion. If a dispersion is used an aqueous dispersion medium is used, i.e. the liquid phase contains water and is preferably the main component. If, besides water, an additional solvent is used, the proportion of water by volume may vary with the water miscibility and the associated polarity of the other solvent component. At least 20% by vol. of the total solvent, preferably at least 30% by vol. and in particular preference at least 50% by vol. is water. Water is preferably used as the sole dispersion medium.

The additional solvent used besides water, if necessary, may comprise one or more further organic solvents which are generally added in smaller proportions, e.g. as co-solvents. Both polar and apolar and aprotic solvents are suitable as additional organic solvents or dispersing agents. Examples of these are alcohols, e.g. aliphatic and alicyclic alcohols with 1 to 8 carbon atoms (in particular methanol, ethanol, n- and i-propanol, butanol, octanol, cyclohexanol), ketones, e.g. aliphatic an alicyclic ketones with 1 to 8 carbon atoms (in particular acetone, butanone and cyclohexanone), esters, e.g. acetic acid ethyl ester and glycol ester, ethers, diethyl ether, dibutyl ether, anisole, dioxane, tetrahydrofurane and tetrahydropyrane, glycol ethers such as mono-, di-, tri- and polyglycol ether, glycols such as ethylene glycol, diethylene glycol and propylene glycol, amides and other nitrogen compounds, e.g. dimethyl acetamide, dimethyl formamide, pyridine, N-methyl pyrrolidine and acetonitrile, sulphoxides and sulphones, e.g. sulpholane and dimethyl sulphoxide, or nitro compounds such as nitrobenzole.

In the method according to the invention an acid aminosilane solution is used as a further component, i.e. the pH value of the solution is smaller than 7. The aminosilane is activated by the acid. The pH value of the aminosilane solution preferably lies within the range of 2 to 6. It is also preferable for the solution to be an aqueous acid aminosilane solution. One or more aminosilanes are mixed with an acid to produce the acid aminosilane solution. Both the aminosilane and the acid may be dissolved in a solvent, which is also preferable for both components. In a further preferred embodiment the aminosilane solution is obtained by mixing undiluted aminosilane with the aqueous acid. Examples of solvents are water and organic solvents, water or an aqueous solvent, i.e. a solvent mixture with an overwhelming proportion of water, being preferable. For examples of organic solvents that can be used and the possible proportions of water by volume in the solvent mixtures, reference is made to the examples mentioned below for the silica dispersion.

Aminosilanes are generally known to the person skilled in the art. An aminosilane or a mixture of two or more aminosilanes may be used. These are, in particular, hydrolysable or hydrolysed aminosilanes, which are silicon compounds which have on the Si atom at least one hydrolysable or already hydrolysed group, i.e. hydroxyl, and at least one non-hydrolysable group that comprises at least one amino group. An amino group contains a basic N atom which is substituted if necessary. This may be a primary, secondary or tertiary amino group.

For example, the aminosilanes used have the general formula

$$R_aSiX_{(4-a)}$$

where the residues X are identical or different and signify hydrolysable groups or hydroxy groups, the residues R are identical or different and represent non-hydrolysable groups, at least one residue R comprising at least one amino group, and a having the value 1, 2 or 3, preferably 1 or 2.

In the general formula X is a hydroxy group or a hydrolysable group which may be identical or different from each other, e.g. hydrogen or halogen (F, Cl, Br or I), alkoxy (preferably $C_{1-6}$-alkoxy, e.g. methoxy, ethoxy, n-propoxy, i-propoxy and butoxy), aryloxy (preferably $C_{6-10}$-aryloxy, e.g. phenoxy), acyloxy (preferably $C_{1-6}$-acyloxy, e.g. acetoxy or propionyloxy), alkylcarbonyl (preferably $C_{2-7}$-alkylcarbonyl, e.g. acetyl), —N(H)—Si($R_3$) (silazane, where R is defined as below), amino, monoalkylamino or dialkylamino with preferably 1 to 12, in particular 1 to 6 carbon atoms. X may also be a siloxy group, e.g. —OSi$Y_3$, where Y may, identically or differently, be one of the groups defined above for X. Preferred hydrolysable residues are halogen, alkoxy groups and acyloxy groups, Particularly preferred hydrolysable residues are $C_{1-4}$-alkoxy groups, in particular methoxy and ethoxy.

In the case of the non-hydrolysable residues R, which may be identical or different from each other, at least residue R has at least one amino group. One non-hydrolysable residue with at least one amino group is preferably present. Residues R may, if necessary, have one or more normal substituents, e.g. alkyl, halogen or alkoxy.

Examples of non-hydrolysable residues R without an amino group are alkyl (preferably $C_{1-6}$-alkyl, such as methyl, ethyl, n-propyl, isopropyl, n-butyl, sec. butyl and tert. butyl, pentyl, hexyl, octyl or undecyl), cycloalkyl (preferably $C_{4-12}$-cycloalkyl, such as cyclopentyl or cyclohexyl), alkenyl (preferably $C_{2-6}$-alkenyl, e.g. vinyl, 1-propenyl, 2-propenyl and butenyl), alinyl (preferably $C_{2-6}$-alkinyl, e.g. acetylenyl and propargyl), aryl (preferably $C_{6-10}$-aryl, e.g. phenyl and naphthyl), and corresponding alkaryls and aralkyls, which preferably contain 7 to 24 C atoms (e.g. tolyl, benzyl and phenethyl). Alkyl residues are preferred.

In the case of the non-hydrolysable residue R with at least one amino group, the amino group is in the end position, side position and/or may be contained in the main chain of the residue. Residue R may also have two or more amino groups. The amino groups in residue R are bound to the silicon atom by alkylene, alkenylene or arylene bridge groups which may be interrupted by oxygen atoms. The bivalent bridge groups mentioned are derived, for example, from the above-mentioned monovalent alkyl, cycloalkyl, alkenyl, aryl, alkaryl or aralkyl residues. The bridge groups generally contain 1 to 18, preferably to 1 to 12, and in particular 1 to 6 carbon atoms. If amino groups are contained in the main chain, two or more such bridge groups may be contained.

The N atom of the amino group may be substituted or not. The amino group or groups of residue R may be primary, secondary or tertiary amino groups —$NR^1_2$ for end position or side position amino groups, or —$NR^1$ for amino groups in the main chain or a side chain, where groups $R^1$ are identical or different and may be selected from hydrogen, alkyl, cycloalkyl, alkenyl, aryl, alkaryl or aralkyl. As specific examples of residues $R^1$ reference is made, in addition to hydrogen, to the above examples of the corresponding residues R without an amino group and the corresponding groups of the specific examples given below. $R^1$ may also have substituents, e.g. hydroxyl, alkoxy, nitro, carbonyl, halogen or alkyl, or may be interrupted by oxygen atoms. Examples of such groups $R^1$ are acryloxy, acetylglycyl, or hydroxylalkyl such as hydroxyethyl. The aminosilane is preferably a monomeric compound and preferably contains no more than 4 and preferably no more than 3 silicon atoms. In particular preference the aminosilane only contains one silicon atom.

Specific examples of aminosilanes that can be used are aminopropyltriethoxysilane, aminopropyltrimethoxysilane, aminomethyltriethoxysilane, aminomethyltrimethoxysilane, aminopropyltrichlorosilane, (N-cyclohexylaminomethyl)triethoxysilane, 2-amino-ethyl-3-aminopropyltrimethoxysilane, N-(n-butyl)-3-aminopropyltrimethoxysilane, 2-amino-ethyl-3-aminopropylmethyldimethoxysilane, (3-aminopropyl)diethoxymethylsilane, (3-amino-propyl)ethyldiethoxysilane, (3-methylaminopropyl)trimethoxysilanes, (aminoethylaminomethyl)phenethyltrimethoxysilane, (N,N-diethyl-3-aminopropyl)trimethoxysilane, (N,N-dimethylamino)dimethylchlorosilane, (N,N-dimethylaminopropyl)trimethoxysilane, (N-acetylglycyl)-3-aminopropyltrimethoxysilane, (N-cyclohexylaminomethyl) methyldiethoxysilane, (N-cyclohexylaminomethyl) triethoxysilane, (N-phenylaminomethyl) methyldimethoxysilane, (N-phenylaminomethyl) trimethoxysilane, 11-aminoundecyltriethoxysilane, 3-(1-aminopropoxy)-3,3-dimethyl-1-propenyltrimethoxysilane, 3-(2,4-dinitrophenylamino)propyltriethoxysilane, 3-aminoethylamino)propylmethyldimethoxysilane, 3-(2-aminoethylamino)propyltrimethoxysilane, 3-(cyclohexylamino)propyltrimethoxysilane, 3-(aminophenoxy)propyltrimethoxysilane, 3-(N-allylamino) propyltrimethoxysilane, 3-(N-styrylmethyl-2-aminoethylamino)-propyltrimethoxysilane, 3-(phenylamino)propyltrimethoxysilane, 3-aminopropyldiisopropylethoxysilane, 3-aminopropyldimethylethoxysilane, 3-aminopropylmethylbis(trimethylsiloxy)silane, 3-aminopropylmethyldiethoxysilane, 3-aminopropyltris-(methoxyethoxyethoxy)silane, 3-aminopropyltris(trimethylsiloxy)silane, 4-aminobutyltriethoxysilane, aminophenyltrimethoxysilane, bis(2-hydroxyethyl)-3-aminopropyltriethoxysilane, diethylaminomethyltriethoxysilane, N,N-dimethylaminomethylethoxysilane, N-(2-aminoethyl)-3-aminoisobutyldimethylmethoxysilane, N-(2-aminoethyl)-3-aminopropylmethyldimethoxysilane, N-(2-aminoethyl)-3-aminopropyltriethoxysilane, N-(2-aminoethyl)-3-aminopropyltrimethoxysilane, N-(2-aminomethyl)-11-aminoundecyltrimethoxysilane, N-(3-acryloxy-2-hydroxypropyl)-3-aminopropyltriethoxysilane, N-(3-methacryloxy-2-hydroxypropyl)-3-aminopropyltriethoxysilane, N-(6-aminohexyl)-aminopropyltrimethoxysilane, N-(hydroxyethyl)-N-methylaminopropyltrimethoxysilane, N-3-[(amino (polypropylenoxy)]aminopropyltrimethoxysilane, n-butylaminopropyltrimethoxysilane, N-cyclohexylaminopropyltrimethoxysilane, N-ethylaminoisobutylmethyldiethoxysilane, N-ethylaminoisobutyltrimethoxysilane, N-methylaminopropylmethyldimethoxysilane, N-methylaminopropyltrimethoxysilane, N-phenylaminomethyltriethoxysilane, phenylbis(dimethylamino)chlorosilane, tert. butylaminopropyltrimethoxysilane, aminopropylsilane triol, N-(2-aminoethyl)-3-aminopropylsilane triol, N-cyclcohexylaminomethyltriethoxysilane, N-cyclohexylaminomethylmethyldiethoxysilane and N-phenylaminomethyltrimethoxysilane.

What is important is that the aminosilane has at least one basic N atom which can be protonised by an acid. The aminosilane or the aminosilane dissolved in a solvent is mixed with an acid to acidify the aminosilane. An aqueous aminosilane solution is suitably used for this purpose.

The aminosilanes and the other hydrolysable silanes that are discussed below and can also be used, if necessary, can also be produced by methods of prior art for surface modification; cf. W. Noll, "Chemie und Technologie der Silicone" (Chemistry and Technology of Silicones), Verlag Chemie GmbH, Weinheim/Bergstrasse (1968), and are commercially available.

Further non-hydrolysable residues R are those with a reactive group, where these residues may also be contained, in particular, in the other hydrolysable silanes that are discussed in the following and can also be used, if necessary, for surface modification, and where the reactive group is, for example, an acryl or acryloxy, methacryl or methacryloxy, a preferably protected isocyanato, a hydroxyl, thio, glycidyl or glycidyloxy or acid anhydride group. These reactive groups may be bound to the silicon atom by alkylene, alkenylene or arylene bridge groups which may be interrupted by oxygen or NH groups. The bridge groups preferably contain 1 to 18 and in particular 1 to 6 carbon atoms. The bivalent bridge groups mentioned and, if necessary, any substituents present, are derived, for example, from the above-mentioned monovalent alkyl, alkenyl, aryl, alkaryl or aralkyl residues. Residue R may also carry more than one reactive group. In particular, the aminosilane may also carry such a reactive group, e.g. on the residue with an amino group.

Examples of non-hydrolysable residues R with reactive groups are (meth)acryloxy-$(C_{1-6})$-alkylene, e.g. (meth)acryloxymethyl, (meth)acryloxyethyl or (meth)acryloxypropyl, isocyanato-$(C_{1-6})$-alkylene, such as 3-isocyanatopropyl, thio-$(C_{1-6})$-alkylene, such as thiopropyl, glycidyloxy-$(C_{1-6})$-alkylene, such as glycidyloxypropyl, (meth)acryl standing for methacryl or acryl. Examples of corresponding aminosilanes or the other hydrolysable silanes with a reactive group, discussed above, that may also be used if necessary, are (meth)acryloxypropylsilanes and (meth)acryloxymethylsilanes, such as 3-(meth)-acryloxypropyltriethoxysilane, 3-(meth)acryloxypropyltrimethoxysilane, 3-(meth)-acryloxymethyltriethoxysilane and 3-(meth)acryloxymethyltrimethoxysilane, bis(2-hydroxyethyl)-3-aminopropyltriethoxysilane, if necessary blocked 3-isocyanatopropyltriethoxysilane and 3-isocyanatopropyldimethylchlorosilane, hydroxymethyltriethoxysilane, mercaptopropyltriethoxysilane, glycidyloxypropyltrimethoxysilane and glycidyloxypropyltriethoxysilane.

Furthermore, one or more non-hydrolysable residues R in the aminosilane and, in particular, in the other hydrolysable silanes that are discussed below and can also be used if necessary, for surface modification, may have organic residues which are substituted with fluorine, in particular linear or branched (per)fluoroalkyl groups. Such fluorinated groups R preferably contain 1 to 30 fluorine atoms, which are preferably bound to aliphatic carbon atoms. The carbon atoms substituted with fluorine are preferably be bound by a non-fluorinated alkylene bridge, such as an ethylene group, to the Si. Examples of fluorinated residues R that can be used are $CF_3CH_2CH_2$—, $C_2F_5CH_2CH_2$—, n-$C_6F_{13}CH_2CH_2$—, i-$C_3F_7OCH_2CH_2CH_2$—, n-$C_8F_{17}CH_2CH_2$— and n-$C_{10}F_{21}$—$CH_2CH_2$—. Examples of fluorosilanes that can be used as additional silanes are $CF_3CH_2CH_2Si(CH_3)OCH_3)_2$, $C_2F_3$—$CH_2CH_2$—$Si(OCH_3)_3$, n-$C_6F_{13}$—$CH_2CH_2Si(OC_2H_5)_3$, n-$C_8F_{17}$—$CH_2CH_2$—$Si(OC_2H_5)_3$, n-$C_{10}F_{21}$—$CH_2CH_2$—$Si(OC_2H_5)_3$, i-$C_3F_7O$—$CH_2CH_2CH_2SiCl_2(CH_3)$ n-$C_6F_{13}$—$CH_2CH_2$—$Si(OCH_2CH_3)_2$ and n-$C_6F_{13}$—$CH_2CH_2$—$SiCl_2(CH_3)$.

The aminosilane may also be used, as already discussed above, in a mixture with one or more other hydrolysable silences for surface modification, e.g. if it is desired to give the silica a further property. The additional silane is preferably contained in the aminosilane solution. All hydrolysable silanes which have at least one non-hydrolysable group are generally suitable for this purpose, the non-hydrolysable group(s) not containing any amino groups. Such silanes are known to the person skilled in the art and are commercially available.

For example, they may be silanes with the above formula $R_aSiX_{(4-a)}$, where residues X are identical or different and signify hydrolysable groups or hydroxy groups, residues R are identical or different and represent non-hydrolysable groups, and where no R contains an amino group and a has the value 1, 2 or 3, preferably 1 or 2. Special examples of residues R and X are, apart from the amino groups, the same as those indicated above for the aminosilanes, which is why reference is made to them. Residue or residues R may, in addition to normal substituents, as indicated above, also contain the reactive functional groups indicated above, such as in particular (meth)acryl groups, protected isocyanate groups, hydroxy groups, thio groups and anhydride groups. Further suitable residues R are linear or branched (per)fluoroalkyl groups. Examples of additional silanes with a reactive group or (per)fluoroalkyl group have already been mentioned above.

If a further silane is used in addition to the aminosilane, the ratio may vary within wide ranges. For example, the molar ratio of the other silane or silanes to the aminosilane or aminosilanes is no more than 3 and preferably no more than 1.5.

Any organic or inorganic acid known to the person skilled in the art may be used as an acid. The acid preferably contains at least one acid group with a pKs value <6. Examples are hydrochloric acid, nitric acid, phosphoric acid, formic acid, acetic acid, propionic acid, trioxadecanic acid, citric acid and sulphonic acids. The acid may be added as such or in a solvent.

The acid is preferably added in the form of an aqueous solution. The quantity of the acid added is chosen so that an acid aminosilane solution is obtained, i.e. with a pH value of less than 7, preferably in the range of 2 to 6.

If an aqueous silica dispersion is used as the initial component, the silica concentration may be selected within wide ranges, but a silica concentration of 5 to 50% by weight, preferably 10 to 40% by weight, related to the total weight of the dispersion, is generally appropriate.

The aminosilane concentration in the mixture to be produced may also be selected within wide ranges. The appropriate ratio depends, for example, on the molecular weight of the silane, the number of amino groups contained per molecule and the specific area of the silica. The person skilled in the art can easily determine the appropriate ratio for the case in question. The greater the area of the powder the more aminosilane is generally required. If powders with a very large area (e.g. 700 m$^2$/g) and/or silanes with a higher molecular mass are used, a concentration of up to 60% by weight or more aminosilane related to silica may be appropriate, for example.

The acid aminosilane solution and the silica powder or silica dispersion may generally be mixed in such a ratio, for example, that 0.1 to 60, preferably 0.5 to 20 and more preferably 1 to 10% by weight of aminosilane, related to silica, may be contained in the mixture. Alternatively the appropriate ratio may be indicated on the basis of the molar concentration of aminosilane related to the area of silica. For example the aminosilane may be added in a quantity of 0.1 to 20 μmols/m$^2$, and preferably 0.5 to 10 μmols/m$^2$ of powder area of silica (related to the BET area of the silica used (measured with nitrogen)).

The aminosilane and acid are mixed by simple combination and suitable agitation. The solution obtained is preferably an aqueous aminosilane solution. The aminosilane solution obtained may be used in the second step immediately after addition of the acid to stabilise silica, and sometimes it may also be appropriate to allow the mixture to stand for some time after the addition of acid to activate it (e.g. a few minutes). After the acid is added, however, it is preferable to use the acid aminosilane solution obtained within 1 hour for the second silica stabilisation step. The acid aminosilane solution is used more preferably no later than 15 mins. or 30 mins. after the acid is added.

In the second step the acid aminosilane solution produced is mixed with silica to obtain the cationically stabilised aqueous silica dispersion. The two components can be mixed in two different ways. Firstly the acid aminosilane solution can be added to an aqueous dispersion of silica or vice versa, whilst suitable agitation is carried out during and/or after the addition, or shearing is carried out if necessary. Such shearing may be appropriate, depending on the viscosity or the solid content, for example, but it is not generally necessary. Alternatively silica may be added to the acid aminosilane solution in the form of powder, or vice versa and the mixture suitably subjected to shearing during and/or after the addition in order to support the dispersion.

A dispersing machine is suitably used for the shearing. Examples of dispersing machines are light beam mixers, dissolves, jet dispersers, homogenisers, turbo agitators, mills such as mills with loose grinding rolls, e.g. agitator ball mills, mortar mills, colloid mills, kneaders such as heavy roll kneaders, and roller seats.

The silica is stabilised cationically when converting silica powder or silica dispersion with the acid aminosilane solution. Here the surfaces of the silica particles are modified by the aminosilane as explained in more detail below. The reaction takes place without problem in the liquid phase of the reaction mixture. The temperature may vary within wide ranges and work can be carried out at room temperature, but higher or lower temperatures may be appropriate due to heating or cooling. The mixture can be heated using a dispersing machine, which may be desirable or may necessitate cooling. The silica and aminosilane are preferably converted, for example, at a temperature of 10° C. to boiling point of the solvent (e.g. 100° C.), and preferably from room temperature (20° C.) to 50° C. The reaction may also be carried out at reduced or increased pressure, but this is not necessary.

A cationically stabilised aqueous silica dispersion is obtained which can be used as it is. If necessary the liquid constituents can be removed partially or completely. The liquid constituents are essentially the solvent or solvents. If necessary the acid or unconverted aminosilane or other components may also comprise the liquid constituents. The liquid constituents are simply referred to in the following as solvents. The solvent may be partially removed, for example, to set a desired concentration. If the solvent is removed completely a cationically stabilised powder is obtained to achieve increased storability. The powder form may also be advantageous for transport or for a change of solvent. Further dispersing of the cationically stabilised silica powder in a solvent such as water is possible at any time. Obviously the powder as such can also be used in the appropriate applications.

The cationically stabilised aqueous silica dispersion obtained by the method according to the invention has advantageously a solid content of 5 to 50% by weight, preferably 5 to 40% by weight, and in particular preference 10 to 30% by weight. The pH value of the dispersion preferably ranges from 2 to 6. The mean particle size of the silica particles is generally less than 800 nm, preferably below 400 nm and more preferably below 200 nm. The mean particle size refers in this description to the $d_{50}$ value of the volume distribution. Methods for determining these particle sizes and the details of these methods are known to the person skilled in the art. Examples of suitable measurement methods are dynamic laser light scattering (e.g. with an ultra-fine particle analyser (UPA)), X-ray disc centrifuge or quantitative image analysis on electron microscopic recordings.

The cationically stabilised aqueous silica dispersions obtained by the method according to the invention also advantageously have an electrical conductivity of less than 10 mS/cm, preferably below 8 mS/cm, and in particular below 5 mS/cm. Surprisingly a dispersion which has an extremely low viscosity relative to the solid content of silica is obtained by the method according to the invention. The viscosity, measured according to Brookfield at 20° C., of the cationically stabilised aqueous silica dispersion is <1.5 Pas, for example, preferably <1.0 Pas, and in particular preference <0.5 Pas. For example, the viscosity may range from 2 to 500 mPas.

It has also been shown that the cationically stabilised aqueous silica dispersion obtained by the method according to the invention has a surprisingly high storage stability. At 20° C. the dispersions are stable for longer than 1 day and may remain stable for longer than 3 days and even much longer.

Organic binding agents or other additives may be added to the dispersion. These additional agents obviously depend on the application concerned, but in principle they may be added at any time. However, they are not generally added until the cationically stabilised dispersion has been formed.

Organic polymers or binding agents can surprisingly be added to the cationically stabilised aqueous silica dispersions obtained by the method according to the invention without a major increase in viscosity.

Water-soluble or water-dispersible polymers or binding agents are particularly suitable for this purpose provided that they are uncharged or cationically stabilised at pH <7. Examples of suitable organic polymers are polyvinyl acetate, polyvinyl butyrate, polyvinyl alcohol, polyvinyl acetal, cellulose resins such as methyl cellulose, ethyl cellulose, hydroxyethyl cellulose, carboxymethyl cellulose, chitin, chitosan, starch, polyethylene oxide, polypropylene oxide, polyethylene glycol, polyvinyl ether, polyacryl amide, polyvinyl pyrrolidone, polyacrylic acid, gelatines, alginates, resins based on maleic acid, polyepoxies, polyaminoamides; and also substituted or functionalised derivatives, e.g. cationically functionalised derivatives thereof, which generally represent water-soluble polymers. Cationically stabilised polymer dispersions such as polyurethane, polyacrylate, vinyl acetate copolymers and silicon resins are also suitable, the method of stabilisation depending on the functional groups.

Examples of preferred organic polymer or binding agents are polyvinyl alcohol, e.g. Mowiol® polymers such as Mowiol® 40-88 from Clariant, polyvinyl acetate and polyvinyl acetal, such as polyvinyl butyral.

Further additives may be added to the cationically stabilised silica dispersion according to the intended application, e.g. flow-control agents, defoaming agents, organic solvents, coalescing agents, biocides, tensides, glycols, hardeners and cross linking agents whose type depends on the binding agent, e.g. boron compounds or, if necessary, protected isocyanates for PVA or aldehydes for gelatines, softeners, e.g. phthalates, pickling agents, e.g. cationically functionalised polymers, antioxidants, co-solvents and wetting and dispersing agents.

Aqueous, cationically stabilised silica dispersions are provided by the invention by modifying silica with an acid aminosilane solution. This is a modification of the surface of the silica particles with the aminosilane. Without wanting to commit to one particular theory, the surface modification is explained in the following.

It is known that hydrolysable groups of silanes can be hydrolysed in the presence of water with the formation of silanol groups. It is also known that acids can catalyse this hydrolysis. The hydrolysable groups of the aminosilanes, if present, can therefore be hydrolysed in the acid aminosilane solution and/or in the acid aqueous mixture obtained by the addition of silica. The extent to which the hydrolysis takes place in the acid aminosilane solution depends on several factors, e.g. pH value, type of silane, time between the addition of the acid to the aminosilane and mixing the aminosilane solution with silica, and can be controlled by the person skilled in the art in the desired manner.

Condensation reactions may in some cases also take place among the hydrolysed aminosilanes, so that after a certain time condensates may be obtained in the aminosilane solution. If necessary the solution may also be a sol. However, excessive formation of condensates should suitably be avoided, so that the time between production of the acid aminosilane solution and mixing with silica should not be too long. As indicated above, this time should be no longer than 1 h and preferably a maximum of 30 minutes.

It is known to the person skilled in the art that relatively reactive groups are normally present on the surface of particles. Residual valencies such as hydroxy groups (—SiOH) or, if necessary, oxy groups are present, for example, as surface groups on silicate particles. After mixing, the reactive surface groups of silica may react with hydrolysed groups of the aminosilanes, i.e. the silanol groups, causing the aminosilanes to be bound directly to the silica surface of the silica particles, so that cationic stabilisation takes place due to the surface modification. This is chemical binding, in particular a covalent binding, between groups on the silica surface and the aminosilane. Since the particles are present in an acid medium, at least some of the amino groups of the aminosilanes bound to the silica particles are protonised. Due to the protonisation of the aminosilane on the amino group or groups positive charges are formed which result in cationic stabilisation. When the solvent is removed to produce the powder, salt may be formed with an existing counter-ion, e.g. from the acid, if the aminosilane bound to the silica particles is present in protonised form.

In the reaction between the surface groups of the silica particles and the silanol groups of the hydrolysed aminosilanes a known condensation reaction takes place with the formation of —Si—O—Si bridges between the silica surface and the aminosilane. Such surface modification reactions between oxide particles and silanes are known in principle. However, it was not known that this was also possible for the combination of silica particles and aminosilane. A method is provided for this by the invention to enable surface modification to be carried out. In contrast to the state of the art, no metal compounds or groups are precipitated or bound on the silica surface of the particles to achieve repolarisation of the surface charge. There is direct binding of the aminosilanes to silica.

The silica cationically stabilised according the invention, particularly in the form of the cationically stabilised aqueous silica dispersions according to the invention, can be used where there is a variety of applications. A preferred application is in coating slips for printing media, e.g. paper, including cardboard and special papers, films and other printing media. This may result, for example, in an improvement in ink absorption. The dispersion is particularly suitable for printing media for inkjet processes, such as inkjet paper.

Further examples of applications of the silica dispersions are in coating compositions for the surface treatment of substrates, such as wood, plastic, metal, textiles or films. The improvements may relate to adhesion, optical and mechanical properties. In particular, increased scratch resistance and frosting can be achieved thereby, so that the dispersions are suitable, for example, for hard coatings of plastics or for frosting. The silica cationically stabilised according to the invention can also be used in coatings on films for better separability or in abrasives and polishing agents for machining surfaces, e.g. ceramics, glasses, glass ceramics and semiconductor wafers, e.g. in the production of electronic components.

Further possible applications of such dispersions are, for example, as an additive in cataphoresis varnishes (cationic electrodipping varnishes), in dried powder form as an additive in powder varnishes, as an additive in cationic textile treatment agents (e.g. fabric conditioners), as a hydrophilising agent in varnishes, plastics, glass and ceramic, as filtration agents, as a precipitation reagent and as an additive in industrial and domestic cleaning agents.

There follow examples to explain the invention that by no means limit the scope of the invention.

EXAMPLE 1

100 g of silica (Aerosil® 200, Degussa) were dispersed in 387 g of distilled water with 5 g of acetic acid and 10 g of APTES (aminopropyltriethyoxysilane) by means of a rotor-stator system (Dispermix, laboratory series X10, Ystral), the pH value of the dispersion being kept to pH 4 by the continuous addition of acetic acid.
Properties of the Dispersion:
Solid content: 19% by weight; electric conductance: 2.8 mS/cm; pH value: 4; particle size: 173 nm (D50, volume distribution); viscosity: 95 mPas at 100 rpm, room temperature (20° C.).

The dispersion is eminently stable, and no increase in viscosity is established even after 5 days. As Example 5 shows, the dispersion can be mixed with PVA without problem.

EXAMPLE 2

15 g of silica (Aerosil® 200, Degussa) were dispersed in 77.4 g of distilled water by means of a rotor-stator system (Dispermix, laboratory series X10, Ystral). A mixture of 1.5 g of APTES and 2.5 g of acetic acid was added to this dispersion with further shearing. A sable cationic silica dispersion was obtained.
Properties of the Dispersion:
Solid content: 15% by weight; electric conductance: 3 mS/cm; pH value: 3.8; particle size: 165 nm (D50, volume distribution); viscosity: 48 mPas at 100 rpm, room temperature.

EXAMPLE 3

15 g of silica (Aerosil® 300, Degussa) were dispersed in 82 g of distilled water with 1.5 g of acetic acid and 1.5 g of APTES by means of a rotor-stator system (Dispermix, laboratory series X10, Ystral). A stable cationic silica dispersion was obtained.
Properties of the Dispersion:
Solid content: 15% by weight; electric conductance: 3 mS/cm; pH value: 4; particle size: 180 nm (D50, volume distribution); viscosity: 48 mPas at 100 rpm, room temperature.

EXAMPLE 4

A solution of 1.3 g of APTES in 17.3 g of water and 0.38 g of acetic acid (30% in water) was added to a dispersion of 12.9 g of silica (Aerosil® 200, Degussa) in 100.6 g of water and 1.1 g of acetic acid (30% in water), with agitation. A stable dispersion was obtained.
Properties of the Dispersion:
Solid content: 10% by weight; electric conductance: 1.8 mS/cm; pH value: 5; particle size: 470 nm (D50, volume distribution); viscosity: 50 mPas at 100 rpm, room temperature.

EXAMPLE 5

33 g of a 11% PVA solution (polyvinyl alcohol, 80% hydrolysed, Mw 9000-10000, Sigma Aldrich) were added to 100 g of a silica dispersion from Example 12 with agitation.

A stable PVA-containing silica dispersion with a viscosity of 54 mPas at 100 rpm, room temperature, was obtained.

EXAMPLE 6

0.55 g of PVA (polyvinyl alcohol, 80% hydrolysed, $M_w$ 9000-10000, Sigma Aldrich) was added to 20 g of a silica dispersion from Example 2 with agitation. A stable PVA-containing silica dispersion with a viscosity of 78 mPas at 100 rpm, room temperature, was obtained.

EXAMPLE 7

A mixture of 100.2 g of distilled water, 2.0 g of APTES and 0.5 of sulphuric acid ($H_2SO_4$ 96%) was produced. The pH value is 2 (test bars, Merck). 20.0 g of Aerosil® 200 (Degussa) were dispersed in the mixture with shearing (Dispermix, laboratory series X10, Ystral). A stable aqueous silica dispersion was obtained.
Properties of the Dispersion:
Solid content: 16% by weight; particle size: 226 nm (D50, volume distribution), viscosity: 64 mPas at 100 rpm; 20° C.

EXAMPLE 8

0.58 g of MTMS (methyltrimethoxysilane) was added to a mixture of 0.98 g of APTES and 0.24 g of sulphuric acid ($H_2SO_4$, 96%). The pH value of the mixture was 3 (test bars, Merck). 20.1 g of Aerosil® 200 Degussa) was dispersed in the mixture with shearing (Dispermix, laboratory series X10, Ystral). A stable aqueous silica dispersion was obtained. The mol ratio of APTES to MTMS is 1:1.
Properties of the Dispersion:
Solid content: 16% by weight, particle size: 190 nm (D50, volume distribution), viscosity: 26 mPas at 100 rpm; 20° C.

The invention claimed is:
1. A method for producing cationically stabilised silica in the form of an aqueous dispersion or a powder, in which a) one or more aminosilanes are mixed with an acid in order to obtain an acid aminosilane solution, b) silica in the form of an aqueous dispersion or a powder is converted by mixing with the acid aminosilane solution in order to obtain a cationically stabilised aqueous silica dispersion, and if necessary c) the liquid constituents are completely or partially removed.

2. The method according to claim 1, characterised in that silica is added to the acid aminosilane solution, wherein the solution is subject to shearing during and/or after the addition.

3. The method according to claim 1, characterised in that the acid aminosilane solution is an aqueous aminosilane solution.

4. The method according to claim 1, characterised in that the silica for the aqueous dispersion or the powder is selected from the group consisting of pyrogenic SiO2, precipitated $SiO_2$, colloidal $SiO_2$, core-shell particles with a shell of $SiO_2$ and a core of metal oxide and combinations thereof.

5. The method according to claim 1, characterised in that the proportion of silica in the aqueous silica dispersion is 5 to 50% by weight related to the total weight of the dispersion.

6. The method according to claim 1, characterised in that the acid aminosilane solution and the silica are mixed in such proportions that 0.1 to 60% by weight of aminosilane related to silica are contained in the mixture.

7. The method according to claim 1, characterised in that the acid aminosilane solution has a pH value in the range of 2 to 6.

8. The method according to claim 1, characterised in that the acid has at least one acid group with pKs value of less than 6.

9. The method according to claim 1, characterised in that an organic binding agent and/or another additive is added to the cationically stabilised aqueous silica dispersion.

10. A cationically stabilised silica in the form of an aqueous dispersion or a powder comprising silica particles, which are modified on the surface with aminosilane, and wherein there is direct binding of the aminosilane to the silica particles, without metal compounds or groups being precipitated or bound on the surface of the silica particles.

11. The cationically stabilised silica according to claim 10, characterised in that the surface modifying aminosilane is present in protonised form.

12. The cationically stabilised silica according to claim 10 in the form of an aqueous dispersion, characterised in that the proportion of silica is 5 to 60% by weight related to the total weight of the dispersion.

13. The cationically stabilised silica according to claim 10 in the form of an aqueous dispersion, characterised in that the pH value is 2 to 6.

14. The cationically stabilised silica according to claim 10 in the form of an aqueous dispersion, characterised in that the electrical conductivity is less than 10 mS/cm.

15. The cationically stabilised silica according to claim 10 in the form of an aqueous dispersion, characterised in that the viscosity is less than 1.5 Pa·s.

16. The cationically stabilised silica according to claim 10, characterised in that the mean particle size of the silica particles is no more than 800 nm.

17. The cationically stabilised silica according to claim 10, characterised in that the silica particles on the surface are additionally modified with at least one further silane without an amino group.

18. The cationically stabilised silica according to claim 10 in the form of an aqueous solution, characterised in that the dispersion also contains an organic binding agent and/or another additive.

19. The cationically stabilised silica according to claim 10, wherein the dispersion has the following additional properties:
solid content of between 5 and 50% by weight;
viscosity measured according to Brookfield at 20° C. of <1.5 Pa·s; and
stability for longer than 1 day.

* * * * *